Oct. 5, 1965    G. I. GRAHAM ETAL    3,210,115
POWER ROTATABLE HOOK DEVICE
Filed Jan. 16, 1963    3 Sheets-Sheet 1
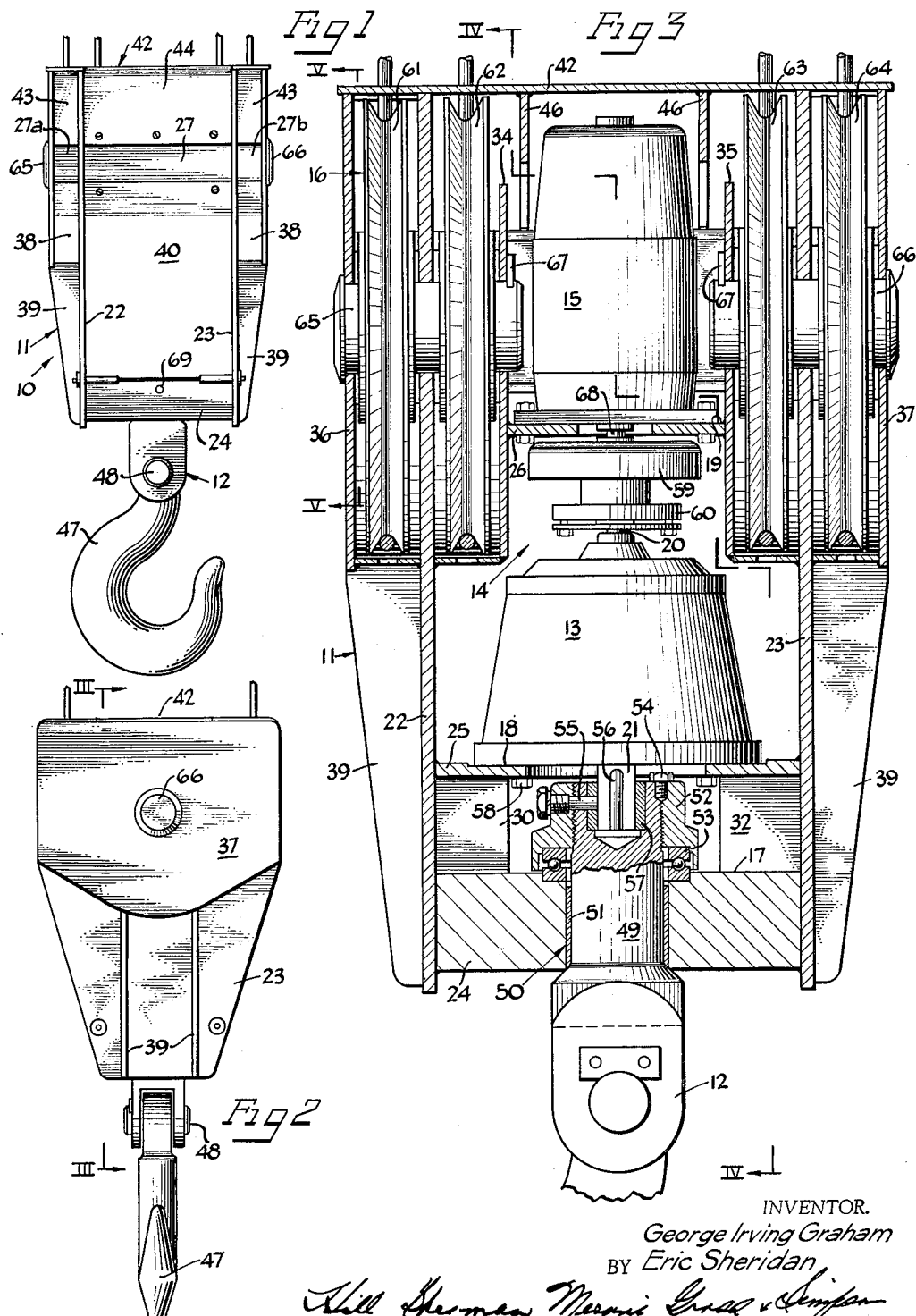
INVENTOR.
George Irving Graham
BY Eric Sheridan
ATTORNEYS Oct. 5, 1965      G. I. GRAHAM ETAL      3,210,115
POWER ROTATABLE HOOK DEVICE
Filed Jan. 16, 1963                      3 Sheets-Sheet 2
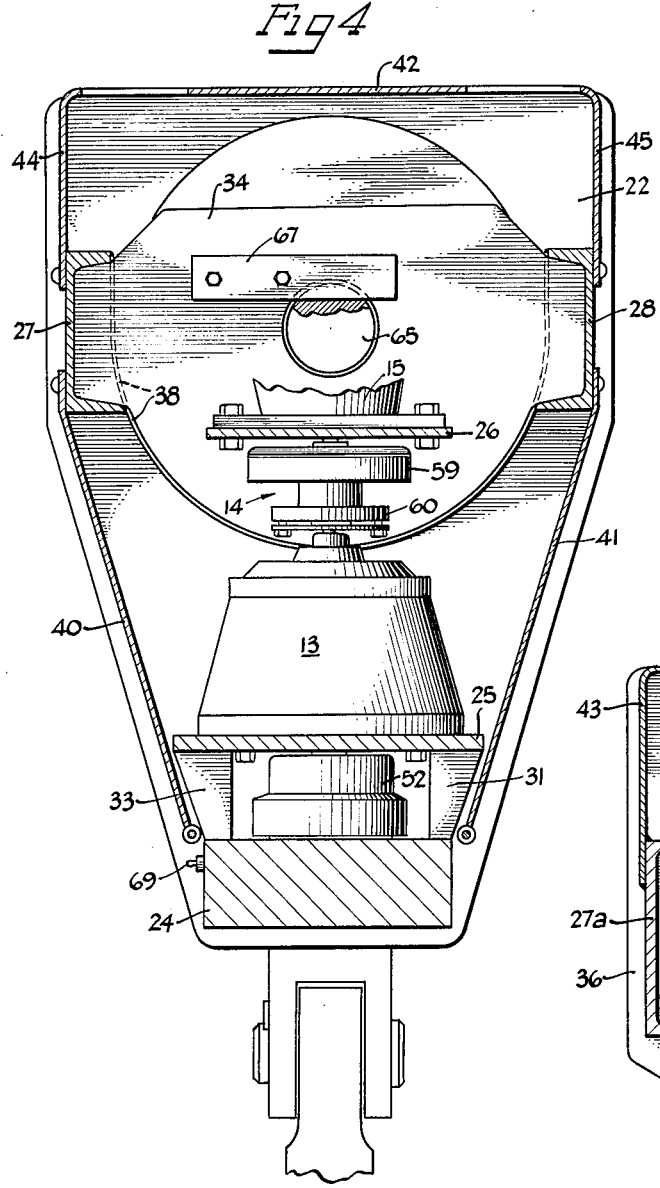
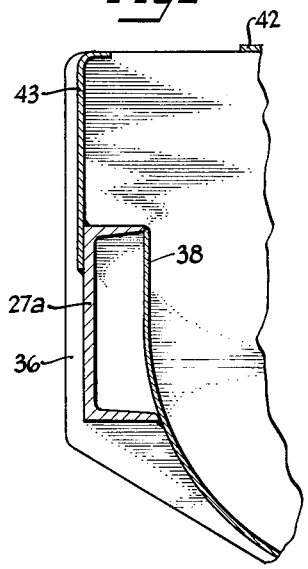
INVENTOR.
George Irving Graham
BY Eric Sheridan
ATTORNEYS Oct. 5, 1965  G. I. GRAHAM ETAL  3,210,115
POWER ROTATABLE HOOK DEVICE
Filed Jan. 16, 1963  3 Sheets-Sheet 3
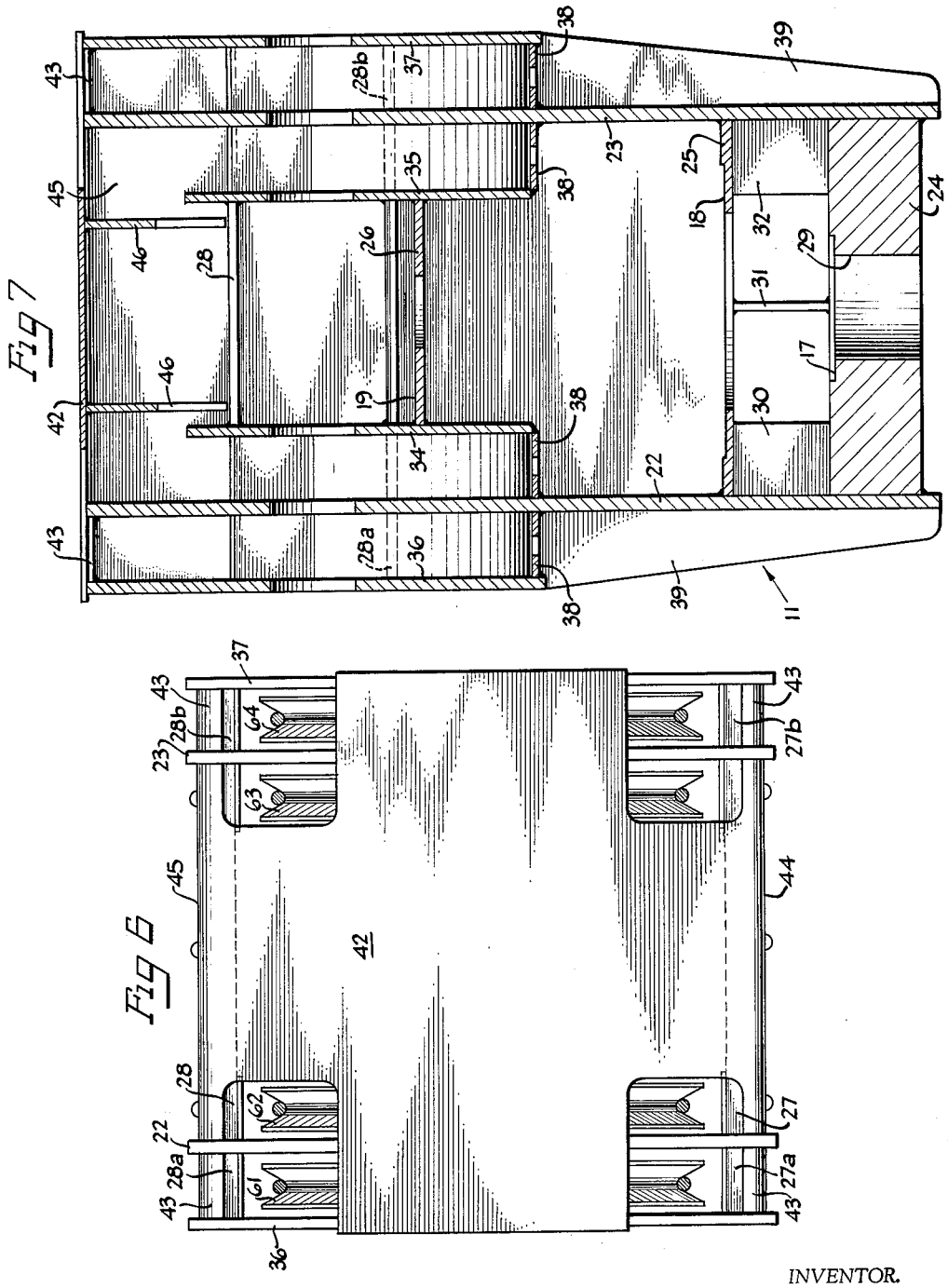
INVENTOR.
George Irving Graham
BY Eric Sheridan
ATTORNEYS

United States Patent Office 3,210,115
Patented Oct. 5, 1965

3,210,115
POWER ROTATABLE HOOK DEVICE
George Irving Graham and Eric Sheridan, Niagara Falls, Ontario, Canada, assignors to Provincial Engineering Ltd., Niagara Falls, Ontario, Canada, a corporation of Canada
Filed Jan. 16, 1963, Ser. No. 251,832
8 Claims. (Cl. 294—82)

This invention relates generally to a power rotatable hook device, and more specifically to such a device wherein the construction is substantially symmetrical and balanced about a vertical axis.

Although the principles of the present invention may be included in various lifting devices, a particularly useful application is made in a hook device of the type that is employed to lift extremely heavy loads. In particular, when such a device is employed to lift multi-ton loads, its construction must necessarily be extremely rugged to withstand the tensile forces involved. With such heavy loads, the need for power rotating means within the device becomes readily apparent. However, when such structure has been provided in the past, there has been created inherently an unbalance within the device itself, frequently making it difficult or dangerous for a person to be in the proximity of the device during engagement or disengagement of the load, such difficulty or danger arising from the fact that the device is inherently unbalanced and is apt to tip or cant due to its own weight. In heavy duty devices, the weight is such that it alone could injure a person against which the device may come in contact.

It has been previously proposed to use fixed or movable counterweights within the device to balance the same. In theory, this would appear to be a sound approach, but as a practical matter, belts or chains have been employed in such devices in conjunction with a gear or pulley carried on a spring loaded element, the linear extent of spring loading being subject to variations due to various causes, which variation in the extent of loading is not uniformly compensated for by counterweights.

The present invention contemplates the utilization of structural components which are so disposed, arranged, and supported on a frame that the structure is inherently symmetrical and hence balanced. No belts or chains are employed, so that the relative location of the mass of any element with respect to other elements is fixed at all times. Thus, spring mountings are avoided and counterweights are eliminated. In this structure, various rotatable elements are arranged so that the rotational axes are concentric with each other and concentric within the supporting frame, which in turn is supported from a central point located above the center of gravity, whereby an inherently uniformly constantly balanced structure is attained which does not tilt or cant as a direct result of removal of the load it supports.

Accordingly, it is an object of the present invention to provide an improved power rotatable hook device.

Another object of the present invention is to provide an improved motorized swivel hook device.

Yet another object of the present invention is to provide a power rotatable hook device which is inherently at all times balanced.

A still further object of the present invention is to provide a power rotatable hook device which employs no counterweights and wherein other elements need not be shifted to achieve a stable balance.

A still further object of the present invention is to provide a power rotatable hook device wherein there are substantially no radial loads on the bearing sleeve for the hook, and wherein substantially only torsional external forces are applied to other mechanical elements directly associated with such rotatable hook.

A still further object of the present invention is to provide a power rotatable hook device having a frame so constructed that the various surfaces requiring machining are so disposed and arranged that a minimum of set-up is required to machine the same.

Many other advantages, features and additional objects of the present invention will become manifest to those versed in the art by making reference to the detailed description and the accompanying sheets of drawings in which a preferred structural embodiment incorporating the principles of the present invention is shown by way of illustrative example.

On the drawings:

FIGURE 1 is a front elevational view of a power rotatable hook device provided in accordance with the principles of the present invention;

FIGURE 2 is a side elevational view of the device shown in FIGURE 1;

FIGURE 3 is an enlarged cross-sectional view taken generally along the line III—III of FIGURE 2;

FIGURE 4 is a cross-sectional view taken generally along the line IV—IV of FIGURE 3, and shown in slightly reduced scale;

FIGURE 5 is a fragmentary cross-sectional view taken generally along line V—V of FIGURE 3, and shown in slightly enlarged scale;

FIGURE 6 is a top view of the device of FIGURE 1, shown in an enlarged scale; and FIGURE 7 is a cross-sectional view of the cover and welded-frame assembly corresponding generally to FIGURE 3 with other parts removed, and shown in slightly reduced scale.

As shown on the drawings:

The principles of this invention are particularly useful when embodied in a power rotatable hook device such as illustrated in FIGURE 1, generally indicated by the numeral 10. This device constitutes a motorized swivel hook block assembly which includes a frame 11, load-support means 12, a speed reducer 13, a drive coupling generally indicated at 14, a motor 15, and means generally indicated at 16 for for suspending the device 10 above its center of gravity. The device further includes cover means described below which enclose the major movable components of the device.

Referring to FIGURES 3 and 7, the frame 11 includes a number of rigid plates, all welded together as a single rigid weldment in which there is provided a plurality of seating faces, the instant embodiment including three parallel spaced seating faces 17, 18, and 19. The first seating face 17 supports the load-support means 12, the second seating face 18 supports the speed reducer 13, and the third seating face 19 supports the motor 15.

The rotational axis of the load-support means 12, coincides with a vertical centerline of the frame 11, which line or axis also coincides with the rotational axis of the drive coupling 14 and of the motor 15. Similarly, the speed reducer 13 has an input shaft 20 and a concentric output shaft 21, which shafts 20 and 21 likewise rotate about the centerline of the frame 11.

As best seen in FIGURE 7, the frame 11 includes a pair of spaced side plates 22, 23 joined together by a bearing block 24, a reducer support 25, a motor support 26, and a pair of channel members 27, 28. The bearing block 24 is provided with an opening 29 concentric with the frame axis, the upper end of which is counterbored to receive a thrust bearing. The reducer support 25 is vertically spaced above the bearing block 24 by a group of four spacer plates 30–33. The motor support 26 is welded to a pair of inner plates 34, 35, both of which are welded to the channel members 27 and 28 as shown in FIGURE 4. It will be appreciated that the motor support 26 could be welded to one of the channel members, such as channel member 28, to accommodate a motor not having a flange mounting as shown. The frame 11 further includes a pair of outer plates 36, 37 respectively welded to four channel member extensions 27a, 28a and 27b, 28b. The channel extensions 27a and 28a are both welded to the side plate 22, while the channel extensions 27b and 28b are both welded to the side plate 22, while the channel extensions 27b and 28b are both welded to the side plate 23.

The frame 11 further includes four substantially identical closure strips 38 of generally semi-circular shape, a first of which encloses the space between the outer plate 36 and the side plate 22, the second of which encloses the lower portion of the space between the side plate 22 and the inner plate 34, the third of which encloses the lower portion of the space between the inner plate 35 and the side plate 23, and the fourth of which encloses the lower portion of the space between the side plate 23 and the outer plate 37. The strips 38 in conjunction with the adjacent plates thus serve to define four upwardly opening sheave pockets. Each of the side plates 22 and 23 is provided with a pair of stiffener ribs 39 which underlie the outermost sheave pockets. The plates 22, 23 and 34–37 are provided with aligned openings which have an axis that intersects the vertical axis of the device at a point above the center of gravity of the device.

The frame 11 further includes cover means which include a pair of hinged covers 40, 41, a top cover 42, and four cover strips 43. As best seen in FIGURES 1 and 4, the covers 40 and 41 are pivotally supported between the side plates 22, 23 and are held in closed position by screws which enter the channel members 27, 28. The top cover 42 rests on the upper surface jointly defined by the plates 22, 23, 36, and 37, the cover 42 including front and rear portions 44, 45 which extend downwardly between the side plates 22 and 23 toward the pivotal covers 40, 41 where they are attached by screws to the channel members 27, 28. At the four corners of the upper surface of the cover 42, there is provided appropriate clearance to enable cable or rope to pass freely therethrough. To partially close the opening thus created in the upper surface, the cover strips 43 are provided and are secured as by welding to the adjacent channel member extension such as 27a shown in FIGURE 5. The top cover 42 has its central portion reinforced by a pair of downwardly extending stiffening ribs 46, 46 which are welded to the central portion and to the downwardly extending portions 44 and 45.

The load-support means 12 may comprise any form at its work-engaging end and has been shown herein as being in the form of a hook 47. It is to be understood that any configuration of work-engaging end is considered equivalent to a hook in this instance, such as an eyelet. The hook 47 is pivoted about a horizontal axis as at 48 to facilitate engagement. The load-support means includes a shank 49 which comprises a part of a rotatable support generally indicated at 50 for the load-support means 12. The rotatable support further includes a sleeve bearing 51 disposed in the bearing block 24, and the shank 49 extends upwardly so that it has a threaded portion lying in the space between the reducer support 25 and the bearing block 24. A threaded cap 52 is carried on the threaded end of the shank 49 and has a downwardly directed counterbore within which there is disposed an axial thrust bearing assembly 53. A lock screw 54 prevents the cap 52 from turning relatively to the shank 49.

The shank 49 has a driving connection with the output shaft 21 with which it telescopes. A shear pin 55 is provided which is threaded into the outer one of the telescoping parts and forms an angular drive connection with the output shaft 21. To this end, the output shaft 21 is keyed as at 56 to a sleeve 57, the threaded shear pin 55 being threaded into the cap 52 and forming a shear connection between the shank 49 and the sleeve 57. With one of the covers 40, 41 opened, access to the head of the threaded shear pin 55 is obtained so that the shear pin 55 may be withdrawn to obtain free rotation of the load-support means 12. The shear pin 55 thus extends radially to the vertical centerline of the device 10.

The speed reducer 13 is secured by screws 58 to the reducer support 25. The reducer 13 is thus mounted in a manner wherein its concentric input and output shafts 20, 21 are rotatable about the same axis as that of the rotatable support 50.

The drive coupling 14 provides a driving connection between the motor 15 and the speed reducer 13, and in this embodiment includes a torque limiting device 59 and a flexible coupling 60. These elements are individually known in the art. The flexible coupling 60 permits slight angular misalignment between the motor 15 and the speed reducer 13, even though they rotate about what is substantially a single axis. The torque limiting means 59 is of the slip type, and preferably is of the eddy current type. If the supported load should meet with an obstruction, the torque limiting device 59 would slip, thereby enabling the motor 15 to continue running, and the load would resume rotation upon removal of such obstruction. The torque limiting device 59 is selected so that it will slip at a torque value less than that which the speed reducer can safely handle. Ordinarily, it would be expected that the shear pin 55 would withstand a higher value of torque.

In this embodiment, the means 16 which suspends the device above the center of gravity comprises a set of sheaves 61–64. The sheaves 61 and 62 are rotatably supported on a shaft 65, while the sheaves 63 and 64 are rotatably supported on a shaft 66. The shafts 65 and 66 are provided with enlarged heads at their outer ends. The shaft 65 extends through the plates 36, 22, and 34, while the shaft 66 extends through the plates 35, 23, and 37. At their inner ends, each of the shafts is provided with a locking plate 67, best seen in FIGURE 4, secured to the inner plates 34 and 35 respectively. Suitable spacers keep the various sheaves 61–64 respectively centered within the various sheave cavities. The rotational axis of the sheaves 61–64 lies above the center of gravity of the device, so that the device thus is pendulously supported about the sheave axis. Other forms of pendulous support may be provided for the frame 11.

Since the sheave axis intersects the centerline of the device, above the center of gravity, and since the device is built symmetrically, the center of gravity will for all practical purposes be located not only below the sheave axis but on the centerline. Such structure is inherently stable so that the device 10 will hang in an upright condition or position both with and without a load suspended from the load-support means 12. When the instant device is constructed to have a frame length of about four feet, and using side plates 22, 23 of steel ¾ inch thick, and with other parts correspondingly proportioned as to size, the resulting device is readily useful in supporting relatively heavy loads, a typical load to be suspended from the hook 47 being 25 tons.

The device 10 is thus constructed in a physically balanced manner without resort to counterweights or to adjustment of element location. Moreover, such balance is extremely stable, and by such construction, external radial loads are for practical purposes eliminated from the hook bearing sleeve 51, the output shaft 68 of the motor 15, and the input and output shafts 20 and 21 of the speed reducer. Rather, these elements are subject for practical purposes only to torsional forces.

The particular frame 11 disclosed herein is advantageous in that the three seating faces 17–19 can be machined from a single machining set-up in a facile manner since such faces can all be parallel to each other and since the vertical centerline extends through each of them. Even if the seating face 19 on the motor support 26 were directed differently to accommodate a different motor, an advantage is nevertheless obtained in that the seating faces 17 and 18 on the bearing block 24 and reducer support 25 may be machined from a single set-up.

The complete device may be readily suspended in a completely balanced condition from a crane or other lifting or conveying device.

By our structure, we have eliminated open gears, chains, belts, overhung gears, pinions, and sprockets as have been used in prior devices, thereby eliminating the need associated therewith for frequent lubrication, maintenance, and adjustment. If lubrication of the shank 49 is desired, a fitting 69 shown in FIGURE 1 may be provided with an appropriate passage to the interior of the rotatable support 50.

Although various minor modifications might be suggested by those versed in the art, it should be understood that we wish to embody within the scope of the patent warranted hereon all such embodiments as reasonably and properly come within the scope of our contribution to the art.

We claim as our invention:

1. A motorized swivel hook device, comprising in combination:
   (a) a frame having a vertical centerline;
   (b) load-support means rotatably supported by said frame for rotation about said centerline;
   (c) a speed reducer having concentric input and output shafts, said speed reducer being supported by said frame with said shafts rotatable about said centerline, said output shaft telescoping with said load-support means;
   (d) a shear pin extending radially of said centerline and drivably connecting said output shaft to said load-support means, said shear pin being threaded into the outer one of said load-support means and output shaft for selective removal;
   (e) a motor carried by said frame and having an output shaft both rotatable about said centerline and drivably connected to the input shaft of said speed reducer; and
   (f) means on said frame for suspending it above the center of gravity of the device.

2. A motorized swivel hook device, comprising in combination:
   (a) a frame having three spaced parallel seating faces through which a vertical centerline extends;
   (b) load-support means rotatably supported by said frame on a first of said faces for rotation about said centerline;
   (c) a speed reducer having concentric input and output shafts, said speed reducer being secured to a second of said faces with said shafts rotatable about said centerline, said output shaft being drivably connected to said load-support means;
   (d) a motor secured to a third of said faces and having an output shaft both rotatable about said centerline and drivably connected to the input shaft of said speed reducer; and
   (e) means on said frame for suspending it above the center of gravity of the device.

3. A motorized swivel hook device, comprising in combination:
   (a) a frame which includes a pair of side plates joined together in spaced relation to each other, said frame having three spaced parallel seating faces between said plates, through which faces a vertical centerline extends;
   (b) load-support means rotatably supported by said frame on a first of said faces for rotation about said centerline;
   (c) a speed reducer having concentric input and output shafts, said speed reducer being supported by said frame on a second of said faces with said shafts rotatable about said centerline, said output shaft telescoping with said load-support means;
   (d) a shear pin extending radially of said centerline and drivably connecting said output shaft to said load-support means, said shear pin being threaded into the outer one of said load-support means and output shaft for selective removal;
   (e) a motor supported by said frame and secured to a third of said faces, said motor having an output shaft rotatable about said centerline;
   (f) a drive coupling both rotatable about said centerline and drivably connecting said motor to the input shaft of said speed reducer, said drive coupling including torque limiting means;
   (g) a pair of axially spaced sheaves each rotatably supported on said frame concentric with each other and independently of each other, and disposed on opposite sides of said motor; and
   (h) cover means secured to said frame and extending between said plates, and enclosing said motor, said speed reducer, and the upper end of said load-support means.

4. A motorized swivel hook device, comprising in combination:
   (a) a frame having a pair of vertically spaced parallel seating faces through which a vertical centerline extends;
   (b) load-support means rotatably supported by said frame on a first of said faces for rotation about said centerline;
   (c) a speed reducer having concentric input and output shafts, said speed reducer being secured to a second of said faces with said shafts rotatable about said centerline, said output shaft being drivably connected to said load-support means;
   (d) a motor carried by said frame and having an output shaft both rotatable about said centerline and drivably connected to the input shaft of said speed reducer; and
   (e) means on said frame for suspending it above the center of gravity of the device.

5. A motorized swivel hook device, comprising in combination:
   (a) a frame having a pair of vertically spaced parallel seating faces through which a vertical centerline extends;
   (b) load-support means rotatably supported by said frame on a first of said faces for rotation about said centerline;
   (c) a speed reducer having concentric input and output shafts, said speed reducer being secured to a second of said faces with said shafts rotatable about said centerline, said output shaft being drivably connected to said load-support means;
   (d) a motor carried by said frame and having an output shaft both rotatable about said centerline, and having a drive connection with the input shaft of said speed reducer;
   (e) said drive connection comprising a drive coupling rotatable about said centerline, and providing rotation between said output shaft of said motor and said input shaft of said speed reducer; and
   (f) means on said frame for suspending it above the center of gravity of the device.

6. A motorized swivel hook device, comprising in combination:
   (a) a frame having a pair of vertically spaced parallel seating faces through which a vertical centerline extends;
   (b) load-support means rotatably supported by said frame on a first of said faces for rotation about said centerline;
   (c) a speed reducer having concentric input and output shafts, said speed reducer being secured to a second of said faces with said shafts rotatable about said centerline, said output shaft having a drive connection with said load-support means;

(d) a motor carried by said frame and having an output shaft both rotatable about said centerline, and having a drive connection with the input shaft of said speed reducer;
(e) one of said drive connections comprising a torque limiting coupling rotatable about said centerline; and
(f) means on said frame for suspending it above the center of gravity of the device.

7. A motorized swivel hook device, comprising in combination:
(a) a frame which includes a pair of side plates joined together in spaced relation to each other, and a pair of vertically spaced parallel seating faces disposed between said side plates, through which seating faces and between which side plates a vertical centerline extends;
(b) load-support means rotatably supported by said frame on a first of said faces for rotation about said centerline;
(c) a speed reducer having concentric input and output shafts, said speed reducer being secured to a second of said faces with said shafts rotatable about said centerline, said output shaft being drivably connected to said load-support means;
(d) a motor carried by said frame and having an output shaft both rotatable about said centerline and drivably connected to the input shaft of said speed reducer;
(e) cover means secured to said frame and extending between said side plates, and enclosing said motor, said speed reducer, and the upper end of said load-support means; and
(f) means on said frame for suspending it above the center of gravity of the device.

8. A motorized swivel hook device, comprising in combination:
(a) a frame having a pair of vertically spaced parallel seating faces through which a vertical centerline extends;
(b) a pair of axially spaced sheaves, each rotatably coaxially supported on said frame independently of each other, and by which said frame may be suspended above the center of gravity of the device;
(c) load-support means rotatably supported by said frame on a first of said faces for rotation about said centerline;
(d) a speed reducer having concentric input and output shafts, said speed reducer being secured to a second of said faces with said shafts rotatable about said centerline, said output shaft being drivably connected to said load-support means; and
(e) a motor carried by said frame and disposed between said sheaves, and having an output shaft both rotatable about said centerline and drivably connected to the input shaft of said speed reducer.

References Cited by the Examiner
UNITED STATES PATENTS

| | | | |
|---|---|---|---|
| 1,577,283 | 3/26 | Mitchell | 294—82 |
| 2,823,944 | 2/58 | Anderson et al. | 294—82 |
| 3,009,728 | 11/61 | Breslav | 294—82 |
| 3,016,260 | 1/62 | Schrader | 214—658 X |

ROBERT B. REEVES, *Acting Primary Examiner.*

SAMUEL F. COLEMAN, *Examiner.*